(12) United States Patent
Maruoka et al.

(10) Patent No.: US 12,259,191 B2
(45) Date of Patent: Mar. 25, 2025

(54) ROTARY HEAT EXCHANGER (71) Applicant: TOHOKU UNIVERSITY, Sendai (JP)

(72) Inventors: Nobuhiro Maruoka, Sendai (JP); Toshimitsu Ono, Sendai (JP); Satoshi Endo, Sendai (JP); Tadanobu Aizawa, Sendai (JP); Kaoru Konno, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 155 days.

(21) Appl. No.: 17/907,635

(22) PCT Filed: Mar. 5, 2021

(86) PCT No.: PCT/JP2021/008652
§ 371 (c)(1),
(2) Date: Sep. 28, 2022

(87) PCT Pub. No.: WO2021/199905
PCT Pub. Date: Oct. 7, 2021

(65) Prior Publication Data
US 2023/0139960 A1    May 4, 2023

(30) Foreign Application Priority Data

Mar. 31, 2020 (JP) ................. 2020-064475

(51) Int. Cl.
*F28D 19/04* (2006.01)
(52) U.S. Cl.
CPC ..................... *F28D 19/04* (2013.01)
(58) Field of Classification Search
CPC .............. F28D 19/04; F28F 19/008
(Continued)

(56) References Cited

U.S. PATENT DOCUMENTS

| 5,165,469 | A  | * | 11/1992 | Smith | ........... | F28F 19/008 165/DIG. 84 |
| 6,196,296 | B1 | * | 3/2001 | Wisniewski | ........... | F25D 31/006 165/47 |
| 11,060,800 | B2 | * | 7/2021 | Maruoka | ........... | F28D 20/021 |

FOREIGN PATENT DOCUMENTS

| CN | 102519283 B | * | 8/2013 |
| GB | 345312 A |  | 3/1931 |

(Continued)

OTHER PUBLICATIONS

"International Application Serial No. PCT/JP2021/008652, International Search Report dated Apr. 20, 2021", w/ English Translation, (Apr. 20, 2021), 5 pgs.

*Primary Examiner* — Jon T. Schermerhorn, Jr.
(74) *Attorney, Agent, or Firm* — Schwegman Lundberg & Woessner, P.A.

(57) ABSTRACT

A rotary heat exchanger includes: a tubular-shaped heat transfer tubular body (3) which is rotatable with a central axis (C) as a rotation center, which allows a first medium (11) to flow therein, and outside of which a second medium (12) having a temperature different from temperature of the first medium (11) flows; a central member (2) which is provided on an inner side of the heat transfer tubular body (3) in a radial direction and which is fixed coaxially with the heat transfer tubular body (3); and an outer sliding contact member (6) which is in sliding contact with an outer circumferential surface of the heat transfer tubular body (3), and the heat transfer tubular body (3) is rotatably supported with respect to the central member (2) via bearings (17, 18) disposed at two end portions of the central member (2) in an axial direction.

9 Claims, 6 Drawing Sheets

(58) Field of Classification Search
USPC .............................................................. 165/8
See application file for complete search history.

(56) References Cited

FOREIGN PATENT DOCUMENTS

| | | | | |
|---|---|---|---|---|
| JP | 5194161 | A | | 8/1976 |
| JP | S62123288 | A | * | 6/1987 |
| JP | H0261496 | A | * | 3/1990 |
| JP | 2005009804 | A | * | 1/2005 |
| JP | 2008202938 | A | * | 9/2008 |
| JP | 4603777 | B2 | * | 12/2010 |
| JP | 2011080657 | A | | 4/2011 |
| JP | 2011149637 | A | | 8/2011 |
| JP | 5506262 | B2 | * | 5/2014 |
| JP | 6081186 | B2 | * | 2/2017 |
| JP | 6630946 | B2 | | 1/2020 |

\* cited by examiner

ROTARY HEAT EXCHANGER

PRIORITY APPLICATIONS

This application is a U.S. National Stage Filing under 35 U.S.C. § 371 from International Application No. PCT/JP2021/008652, filed on Mar. 5, 2021, and published as WO2021/199905 on Oct. 7, 2021, which claims the benefit of priority to Japanese Application No. 2020-064475, filed on Mar. 31, 2020; the benefit of priority of each of which is hereby claimed herein, and which applications and publication are hereby incorporated herein by reference in their entireties.

TECHNICAL FIELD

The present invention relates to a rotary heat exchanger.
The present application claims priority based on Japanese Patent Application No. JP-A-2020-064475 filed on Mar. 31, 2020, and the contents thereof are incorporated by reference.

BACKGROUND ART

As a technique for efficiently using thermal energy, there is a heat exchanger capable of exchanging heat between fluids having temperature differences and dissipating stored thermal energy in a stepwise manner. Japanese Patent No. 6630946 (Patent Literature 1) discloses, as a configuration of such a heat exchanger, a configuration of a rotary heat exchanger including a heat transfer tubular body allowing a heat medium to flow inside thereof; a latent heat storage material disposed on an outer side of the heat transfer tubular body; an outer fixed blade that is in sliding contact with an outer circumferential portion of the heat transfer tubular body as the heat transfer tubular body rotates; and an inner fixed blade that is in sliding contact with an inner circumferential portion of the heat transfer tubular body as the heat transfer tubular body rotates. The fixed blades peel off a solidified layer formed on a surface of the heat transfer tubular body to reduce heat transfer resistance between the heat medium and the latent heat storage material, thereby improving heat transfer efficiency of the rotary heat exchanger.

CITATION LIST

Patent Literature

Patent Literature 1: Japanese Patent No. 6630946

SUMMARY OF INVENTION

Technical Problem

These heat exchangers may be used in combination of various media such as a gas-liquid system in which heat is exchanged between gas and a liquid, in addition to a liquid-liquid system in which heat is exchanged between liquids. Depending on a type of a medium, boundary films may be formed instead of the solidified layer or together with the solidified layer. Since these boundary films also increase the heat transfer resistance, it is desirable to peel off the boundary films from an outer surface of the heat transfer tubular body.

However, in the technique disclosed in Patent Literature 1, since the heat transfer tubular body is supported only on one side in an axial direction, a gap may be formed between the heat transfer tubular body and the fixed blades due to whirling when the heat transfer tubular body rotates. When the gap is formed, the solidified layers, the boundary films, and the like on an outer circumferential surface of the heat transfer tubular body cannot be sufficiently peeled off by the fixed blades, and the solidified layer, the boundary films, and the like tend to remain. Therefore, in the related art, there is room for improvement in improving the heat transfer efficiency by reducing residuals of the solidified layer, the boundary films, and the like and further reducing the heat transfer resistance.

The invention is made in view of the above circumstances, and an object of an aspect of the invention is to provide a rotary heat exchanger in which heat transfer efficiency is further improved as compared with that in the related art.

Solution to Problem

In order to achieve the above object, the invention adopts following devices.

(1) A rotary heat exchanger according to an aspect of the invention includes: a tubular-shaped heat transfer tubular body which is rotatable with a central axis as a rotation center, which allows a first medium to flow therein, and outside of which a second medium having a temperature different from a temperature of the first medium is disposed; a central member which is provided on an inner side of the heat transfer tubular body in a radial direction and which is fixed coaxially with the heat transfer tubular body; and an outer sliding contact member which is in sliding contact with an outer circumferential surface of the heat transfer tubular body, and the heat transfer tubular body is rotatably supported with respect to the central member via bearings disposed at two end portions of the central member in an axial direction.

(2) The rotary heat exchanger according to (1) may further include: an inner sliding contact member which is attached to the central member and which is in sliding contact with an inner circumferential surface of the heat transfer tubular body.

(3) A rotary heat exchanger according to an aspect of the invention includes: a tubular-shaped heat transfer tubular body which is rotatable with a central axis as a rotation center, which allows a first medium to flow therein, and outside of which a second medium having a temperature different from a temperature of the first medium is disposed; and at least one of an outer sliding contact member which is sliding with in contact an outer circumferential surface of the heat transfer tubular body and an inner sliding contact member which is in sliding contact with an inner circumferential surface of the heat transfer tubular body, and the heat transfer tubular body is rotatably supported at two end portions of the heat transfer tubular body in an axial direction.

(4) The rotary heat exchanger according to (3) may further include: a central member which is provided coaxially with the central axis on an inner side of the heat transfer tubular body in a radial direction and which rotatably supports the heat transfer tubular body.

(5) In the rotary heat exchanger according to (2) or (4), in the inner sliding contact member, a tip end portion in sliding contact with the heat transfer tubular body may have higher flexibility than a base end portion positioned on a central member side in the radial direction.

(6) In the rotary heat exchanger according to any one of (1), (2), (4), and (5), the central member may include: an introduction pipe configured to introduce the first medium into the heat transfer tubular body from one end portion in the axial direction; and a discharge pipe provided at the one end portion in the axial direction and configured to discharge the first medium subjected to heat exchange from an inside of the heat transfer tubular body.

(7) In the rotary heat exchanger according to any one of (1) to (6), the second medium may be a latent heat storage material configured to store heat using latent heat during solid-liquid phase transformation.

(8) The rotary heat exchanger according to any one of (1) to (7) may further include: an outer cylinder which is provided coaxially with the heat transfer tubular body and which is disposed on an outer side of the heat transfer tubular body in the radial direction at a predetermined interval, the outer sliding contact member may be disposed between the heat transfer tubular body and the outer cylinder, and the second medium may flow between the heat transfer tubular body and the outer cylinder.

(9) In the rotary heat exchanger according to any one of (1) to (8), when viewed in the axial direction, the outer sliding contact member may be inclined so as to move away from the central axis from an upstream side to a downstream side in a rotation direction of the heat transfer tubular body.

(10) The rotary heat exchanger according to any one of (1) to (9) may further include: a bottom plate which supports the outer sliding contact member, and the heat transfer tubular body may be rotatably supported by the bottom plate.

Advantageous Effect

According to the invention, it is possible to provide the rotary heat exchanger in which heat transfer efficiency is further improved as compared with that in the related art.

DESCRIPTION OF EMBODIMENTS

Hereinafter, preferred embodiments of the invention will be described in detail with reference to the drawings, but the invention is not limited to the drawings. In the following description and drawings, the same or corresponding elements are denoted by the same reference signs, and redundant description may be omitted.

First Embodiment

Figure 1:
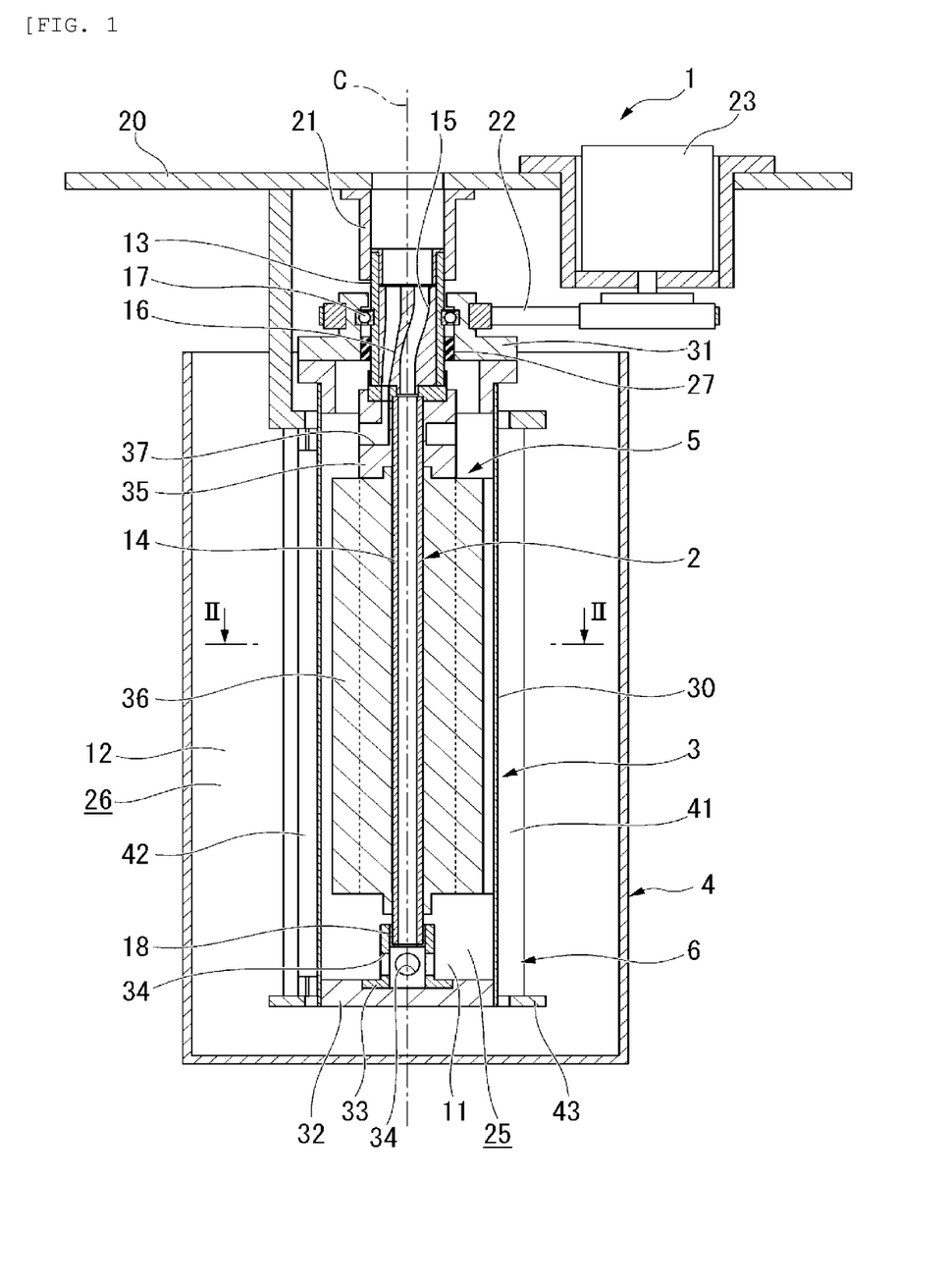
FIG. 1 is a cross-sectional view of a rotary heat exchanger according to a first embodiment.
Figure 2:
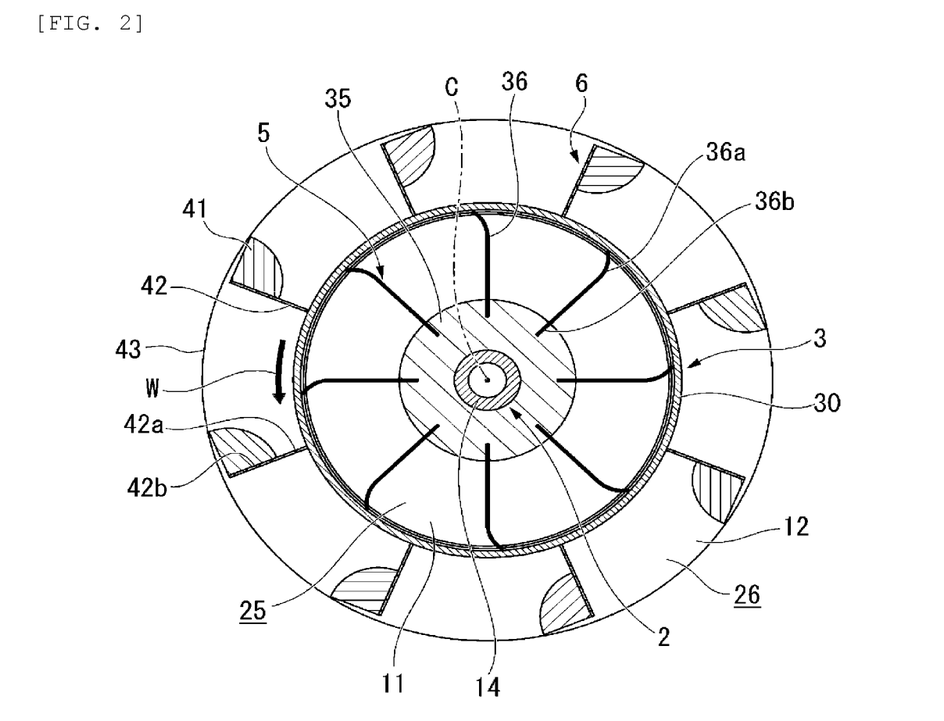
FIG. 2 is a cross-sectional view taken along a line II-II in FIG. 1.

FIG. 1 is a cross-sectional view of a rotary heat exchanger 1 according to a first embodiment. FIG. 2 is a cross-sectional view taken along a line II-II in FIG. 1.

The rotary heat exchanger 1 shown in FIG. 1 is a device for transferring (storing and dissipating heat) and utilizing thermal energy by exchanging heat between a first medium 11 and a second medium 12 having different temperatures. The rotary heat exchanger 1 includes a central member 2, a heat transfer tubular body 3, an outer cylinder 4, an inner sliding contact member 5, and an outer sliding contact member 6.

The central member 2 is formed in a cylindrical shape centered on a central axis C. The central member 2 extends in a direction along the central axis C as a longitudinal direction. The central member 2 is formed of a material having high strength such as stainless steel. In the following description, a direction along the central axis C of the central member 2 may be referred to as an axial direction, a direction orthogonal to the axial direction may be referred to as a radial direction, and a direction around the axial direction may be referred to as a circumferential direction.

The central member 2 includes an attachment base portion 13, a central member main body 14, an introduction pipe 15, and a discharge pipe 16.

The attachment base portion 13 is provided at one end portion in the axial direction. The attachment base portion 13 is formed in a cylindrical shape centered on the central axis C. The attachment base portion 13 is fixed to a housing 20 provided on a first side in the axial direction with respect to the central member 2. Specifically, the housing 20 has a tubular projecting portion 21 provided coaxially with the central axis C, and one end portion of the attachment base portion 13 is inserted into an inner circumferential portion of the tubular projecting portion 21. The attachment base portion 13 is fixed to the housing 20 by a fastening member such as a bolt in a state where the attachment base portion 13 is inserted into the tubular projecting portion 21. The attachment base portion 13 may be fixed to the housing 20 by a method other than fastening, such as welding. The attachment base portion 13 and the housing 20 may be integrally formed.

The central member main body 14 is coupled to the other end portion of the attachment base portion 13. The central member main body 14 extends from the attachment base portion 13 toward a second side in the axial direction. The second side in the axial direction refers to an opposite side of the first side in the axial direction. The central member main body 14 is formed in a cylindrical shape having a diameter smaller than that of the attachment base portion 13. A cavity in which the first medium 11 can flow is formed inside the attachment base portion 13 and the central member main body 14 thus formed. The first medium 11 flows inside the central member 2 from the first side toward the second side in the axial direction. The central member main body 14 and the attachment base portion 13 may be formed separately and then fixed to each other by a fastening member, for example, or may be integrally formed. Outer diameters of the attachment base portion 13 and the central member main body 14 may be the same. For example, one of the attachment base portion 13 and the central member main body 14 may be extended in the axial direction to serve as the remaining other of the attachment base portion 13 and the central member main body 14.

The introduction pipe 15 and the discharge pipe 16 are provided at an end portion (one end portion) on a housing 20 side of the central member 2 in the axial direction. The introduction pipe 15 and the discharge pipe 16 are provided inside the attachment base portion 13. The introduction pipe 15 is coupled to one end portion of the central member main body 14. The introduction pipe 15 supplies the first medium 11 to the inside of the central member main body 14. The discharge pipe 16 discharges the first medium 11 moved from the second side to the first side in the axial direction outside the central member main body 14 in the radial direction.

As shown in FIGS. 1 and 2, the heat transfer tubular body 3 is disposed outside the central member 2 in the radial direction. The heat transfer tubular body 3 is formed in a cylindrical shape coaxial with the central axis C. A length of the heat transfer tubular body 3 along the axial direction is larger than a length of the central member 2 along the axial direction. A first region 25 in which the first medium 11 can flow is formed on an inner side of the heat transfer tubular body 3 in the radial direction, that is, between the heat transfer tubular body 3 and the central member 2. A second region 26 in which the second medium 12 having a temperature different from that of the first medium 11 can flow is formed on an outer side of the heat transfer tubular body 3 in the radial direction. That is, heat exchange is performed between the first medium 11 and the second medium 12 via the heat transfer tubular body 3.

The heat transfer tubular body 3 includes a main body portion 30, a first closing member 31, and a second closing member 32. The main body portion 30 is formed in a cylindrical shape coaxial with the central axis C. The main body portion 30 is formed of a material having good thermal conductivity. Examples of the material for the heat transfer tubular body 3 include aluminum and copper. As the material for the heat transfer tubular body 3, for example, stainless steel, or titanium may be used in addition to the above materials. In this case, the material for the heat transfer tubular body 3 is particularly suitable in an environment where corrosion resistance is required. Further, when a medium is a molten salt or the like, ceramics or the like may be used as the material for the heat transfer tubular body 3.

The first closing member 31 closes an opening of the main body portion 30 on the housing 20 side in the axial direction. The first closing member 31 is coupled to the main body portion 30. A seal portion 27 is provided at a predetermined position between the first closing member 31 and the central member 2. The seal portion 27 prevents the first medium 11 in the heat transfer tubular body 3 from leaking to an outside.

The second closing member 32 closes an opening of the main body portion 30 on an opposite side with respect to the housing 20 in the axial direction. The second closing member 32 is coupled to the main body portion 30. By providing the first closing member 31 and the second closing member 32, internal and external communication of the first medium 11 in the heat transfer tubular body 3 can be realized only through the introduction pipe 15 and the discharge pipe 16 of the central member 2.

The second closing member 32 includes a relay member 33. The relay member 33 is formed in a tubular shape coaxial with the central member 2. The relay member 33 projects from the second closing member 32 toward a central member 2 side in the axial direction. The other end portion of the central member 2 is inserted into an inner circumferential portion of the relay member 33 via a second bearing (bearings in claims) 18, which will be described in detail later. A plurality of holes 34 which enable internal and external communication of the relay member 33 are formed in a side portion of the relay member 33. The first medium 11 flowing inside the central member 2 is supplied to the first region 25 inside the heat transfer tubular body 3 via these holes 34.

The second closing member 32 and the central member main body 14 may be directly coupled to each other without providing the relay member 33. That is, for example, a bearing (not shown) may be provided in the second closing member 32, and the central member main body 14 may be rotatably attached to the second closing member 32 via the bearing. In this case, the first medium 11 in the central member 2 can be supplied to the first region 25 by forming the holes 34 in a side surface of the central member main body 14.

The heat transfer tubular body 3 thus formed is configured to rotate with the central axis C as a rotation center. Specifically, as shown in FIG. 1, the heat transfer tubular body 3 is rotatably supported with respect to the central member 2 via bearings 17 and 18 disposed at the two end portions of the central member 2 in the axial direction. The first bearing (bearings in claims) 17 positioned on the housing 20 side of the bearings disposed at the two end portions is a rolling bearing which includes, for example, an inner ring, an outer ring, and rolling elements. The inner ring of the first bearing 17 is inserted into and fixed to the attachment base portion 13. The outer ring of the first bearing 17 is fixed to an inner circumferential surface of the first closing member 31 of the heat transfer tubular body 3. The first bearing 17 may be a slide bearing formed in an annular shape.

The second bearing 18 positioned on the opposite side with respect to the housing 20 of the bearings disposed at the two end portions is, for example, an annular slide bearing disposed coaxially with the central axis C. An outer circumferential surface of the second bearing 18 is fixed to the relay member 33 provided in the second closing member 32 of the heat transfer tubular body 3. The other end portion of the central member main body 14 is slidably inserted into an inner circumferential surface of the second bearing 18.

A drive belt 22 is wound around an outer circumferential portion of the heat transfer tubular body 3. The drive belt 22 is coupled to a motor 23 provided in the housing 20. When the motor 23 is driven, the heat transfer tubular body 3 is driven by the drive belt 22 and rotates about the central axis C. Drive power of the drive belt 22 is not limited to a motor, and may be, for example, power such as hydraulic power or wind power.

The outer cylinder 4 is formed in a cylindrical shape coaxial with the heat transfer tubular body 3. The outer cylinder 4 is disposed on an outer side of the heat transfer tubular body 3 in the radial direction at a predetermined interval. The second medium 12 can flow inside the outer cylinder 4. In other words, the second region 26 in which the second medium 12 is present is formed between the heat transfer tubular body 3 and the outer cylinder 4 in the radial direction. The outer cylinder 4 is formed in a container shape in which an upper portion is opened and an opening at a lower end portion is closed. In the outer cylinder 4, for example, two end portions of the second region 26 in the axial direction may be closed by closing plates (not shown). The rotary heat exchanger 1 may be immersed in a water tank, a pool, a natural pond, or the like filled with media without providing the outer cylinder 4.

As shown in FIG. 2, the inner sliding contact member 5 is disposed between the central member 2 and the heat transfer tubular body 3. In other words, the inner sliding contact member 5 is disposed in the first region 25. The inner sliding contact member 5 is attached to the central member 2. The inner sliding contact member 5 is in sliding contact with an inner circumferential surface of the heat transfer tubular body 3 when the heat transfer tubular body 3 rotates. The inner sliding contact member 5 includes an inner blade fixing portion 35 and inner blades 36.

The inner blade fixing portion 35 is fixed to an outer circumferential portion of the central member 2. As shown in FIG. 1, a plurality of through holes 37 are formed in the circumferential direction at an end portion of the inner blade fixing portion 35 on the housing 20 side in the axial direction. The through holes 37 establish communication between an outer circumferential portion of the inner blade fixing portion 35 and the discharge pipe 16 provided in the central member 2. Therefore, the first medium 11 flowing in the first region 25 is guided by the inner blade fixing portion 35 through the through holes 37 to the discharge pipe 16 and discharged to the outside. The through holes 37 are formed at positions which do not overlap with the inner blades 36, which will be described later, in the axial direction.

As shown in FIG. 2, the inner blades 36 are attached to the outer circumferential portion of the inner blade fixing portion 35. A plurality of (eight in the present embodiment) inner blades 36 are provided at equal intervals in the circumferential direction. The inner blade 36 is formed in a rectangular plate shape which is long in the axial direction, with the circumferential direction as a plate thickness direction. One long side of the inner blade 36 is coupled to the outer circumferential portion of the inner blade fixing portion 35. When viewed in the axial direction, the inner blades 36 extend radially outward in the radial direction from the inner blade fixing portion 35. The inner blades 36 extend along the radial direction of the heat transfer tubular body 3. The inner blades 36 are formed of an elastic material such as a resin material or rubber. More preferably, the inner blades 36 are made of a self-lubricating material such as Teflon (registered trademark) or POM.

A tip end portion 36a of the inner blade 36 positioned on an outer side in the radial direction has higher flexibility than a base end portion 36b of the inner blade 36 positioned on an inner side in the radial direction. Having high flexibility means that a deformation amount is large with respect to a stress applied from the outside, and a configuration is included in which a displacement amount increases toward a tip end portion which is a free end relative to a base end portion coupled to a fixed end, such as a brush. For example, the tip end portion 36a may have high flexibility by forming the inner blade 36 such that strength of a material decreases from the base end portion 36b toward the tip end portion 36a. The tip end portion 36a may be provided with high flexibility by forming a slit, a hole, or the like in the tip end portion 36a.

The tip end portion 36a of the inner blade 36 is in sliding contact with the heat transfer tubular body 3. More specifically, when the heat transfer tubular body 3 rotates, the inner blades 36 are in sliding contact with the inner circumferential surface of the heat transfer tubular body 3 in a state of being curved along an advancing direction side in a rotation direction W of the heat transfer tubular body 3. Therefore, the inner blades 36 can always come into sliding contact with the heat transfer tubular body 3 during the rotation of the heat transfer tubular body 3.

The inner sliding contact member 5 thus formed plays a role of peeling off, by the rotation of the heat transfer tubular body 3, a boundary film of the first medium 11 formed in the vicinity of the inner circumferential surface of the heat transfer tubular body 3. Accordingly, heat transfer resistance in the vicinity of the inner circumferential surface of the heat transfer tubular body 3 is reduced, and a heat transfer speed between the heat transfer tubular body 3 and the first medium 11 is increased. In the related art in which a heat transfer tubular body is supported on one side in an axial direction, a gap may be formed even when the heat transfer tubular body is in extremely close contact with the inner sliding contact member 5 due to vibration of the heat transfer tubular body or the heat transfer tubular body not being a perfect circle. Further, a gap may be gradually formed due to long-term use. In contrast, according to a configuration of the inner sliding contact member 5 of the present embodiment, it is possible to reliably prevent the formation of the gap by elastic deformation of the inner blades 36, and it is possible to dispose the inner blades 36 so as to always rub against a surface of the heat transfer tubular body 3.

The outer sliding contact member 6 is disposed between the heat transfer tubular body 3 and the outer cylinder 4. In other words, the outer sliding contact member 6 is disposed in the second region 26. As shown in FIG. 1, the outer sliding contact member 6 is attached to the housing 20. The outer sliding contact member 6 is in sliding contact with an outer circumferential surface of the heat transfer tubular body 3 when the heat transfer tubular body 3 rotates. The outer sliding contact member 6 includes outer blade fixing portions 41 and outer blades 42.

As shown in FIGS. 1 and 2, the outer blade fixing portion 41 extends along the axial direction on an outer side of the heat transfer tubular body 3 in the radial direction. A plurality of (eight in the present embodiment) outer blade fixing portions 41 are provided in the circumferential direction. The outer blade fixing portion 41 is formed in a fan shape in cross section when viewed in the axial direction. A cross-sectional shape of the outer blade fixing portion 41 is not limited to the fan shape. One end portion of each outer blade fixing portion 41 in the axial direction is coupled to the housing 20. Accordingly, when the heat transfer tubular body 3 rotates, the outer blade fixing portion 41 does not rotate. The other end portion of each outer blade fixing portion 41 in the axial direction is coupled to a common bottom plate 43. The bottom plate 43 is formed in an annular shape coaxial with the heat transfer tubular body 3. The bottom plate 43 is a non-rotating member disposed on the outer circumferential portion of the heat transfer tubular body 3.

As shown in FIG. 2, the outer blades 42 are attached to the outer blade fixing portions 41. In the present embodiment, the outer blade 42 is formed in a rectangular plate shape which is long in the axial direction. The outer blade 42 projects inward in the radial direction from the outer blade fixing portion 41. Similarly to the inner blades 36, the outer blades 42 are formed of an elastic material such as a resin material or rubber which can be curved in accordance with the rotation of the heat transfer tubular body 3. A tip end portion 42a of the outer blade 42 positioned on an inner side in the radial direction is in close contact with or in sliding contact with the outer circumferential surface of the heat transfer tubular body 3.

A shape of the outer blade 42 is not limited to the rectangular plate shape along the axial direction described above. The outer blade 42 may have, for example, a screw shape formed in a spiral shape along the axial direction.

The outer sliding contact member 6 thus formed plays a role of peeling off a boundary film of the second medium 12 formed in the vicinity of the outer circumferential surface of the heat transfer tubular body 3 by the rotation of the heat transfer tubular body 3. Accordingly, heat transfer resistance in the vicinity of the outer circumferential surface of the heat transfer tubular body 3 is reduced, and a heat transfer speed between the heat transfer tubular body 3 and the second medium 12 is increased. When a flow of the second medium 12 is generated by the rotation of the heat transfer tubular body 3, the outer sliding contact member 6 stirs the second medium 12. Therefore, it is possible to use heat retained by the entire second medium 12, and a heat dissipation amount is increased. Further, the outer sliding contact member 6 causes the second medium 12 to flow in the radial direction by causing the second medium 12 to flow along the outer blades 42. Accordingly, the outer sliding contact member 6 plays a role of strengthening stirring of the second medium 12.

(Heat Exchange Using Rotary Heat Exchanger)

Next, heat exchange using the above rotary heat exchanger 1 will be described.

First, heat exchange when a temperature of the first medium 11 is lower than a temperature of the second medium 12 will be described.

In the present embodiment, the first medium 11 during heat storage is, for example, water. The second medium 12 is, for example, spring water of hot spring having a temperature higher than that of the first medium 11. The first medium 11 flowing inside the heat transfer tubular body 3 has less impurities than the second medium 12, and is a relatively clean fluid which does not generate a solidification phase or the like due to heat reception. Therefore, as the second bearing 18 exposed to the first medium 11, it is possible to use a component such as a slide bearing which is inexpensive and which can be used in water.

The second medium 12 is present in the second region 26 between the heat transfer tubular body 3 and the outer cylinder 4. The second medium 12 is circulated or flows in the second region 26 by a pump or the like (not shown). The heat transfer tubular body 3 rotates around the central axis C.

First, the first medium 11 is introduced into the central member 2 from the introduction pipe 15, and moves inside the central member 2 from the first side to the second side in the axial direction. The first medium 11 which reaches the other end portion of the central member 2 is discharged from the holes 34 of the relay member 33, and flows into the first region 25 which is a region inside the heat transfer tubular body 3 and outside the central member 2. Next, the first medium 11 flows in the first region 25 from the second side toward the first side in the axial direction. At this time, heat exchange is performed between the first medium 11 flowing inside the heat transfer tubular body 3 and the second medium 12 flowing outside the heat transfer tubular body 3 via the heat transfer tubular body 3. Accordingly, the temperature of the first medium 11 increases, and the temperature of the second medium 12 decreases.

At this time, in the vicinity of the inner circumferential surface of the heat transfer tubular body 3, the first medium 11 and the heat transfer tubular body 3 relatively move, and thus the boundary film of the first medium 11 is formed as an extremely thin region in a phase boundary portion. Similarly, at least one of the boundary film and a solidified layer of the second medium 12 is formed in the vicinity of the outer circumferential surface of the heat transfer tubular body 3. In the region where these boundary films are formed, thermal conductivity is lower than in other regions where boundary films are not formed.

Here, in the rotary heat exchanger 1 according to the present embodiment, when the heat transfer tubular body 3 rotates, the inner sliding contact member 5 comes into sliding contact with the inner circumferential surface of the heat transfer tubular body 3, and the outer sliding contact member 6 comes into sliding contact with the outer circumferential surface of the heat transfer tubular body 3. Accordingly, boundary films on the inner circumferential surface and the outer circumferential surface of the heat transfer tubular body 3 are peeled off by the inner sliding contact member 5 and the outer sliding contact member 6. Therefore, a decrease in the thermal conductivity is prevented.

Next, the first medium 11 which flows inside the heat transfer tubular body 3 and which moves to the first side in the axial direction is guided into the discharge pipe 16 through the through holes 37 formed in the inner blade fixing portion 35. The first medium 11 is discharged to the outside of the heat transfer tubular body 3 through the discharge pipe 16.

In the case of using a spring water in which a boundary film is formed as the second medium 12 as described above, a brush may be used as the outer sliding contact member 6. Accordingly, it is possible to reliably bring the outer sliding contact member 6 into sliding contact with the outer circumferential surface of the heat transfer tubular body 3, and a decrease in heat transfer efficiency due to adhesion of solid products such as hot water sinter to the heat transfer tubular body 3 can be prevented. The outer sliding contact member 6 may be formed of a material having hardness higher than that of the above elastic material, such as metal.

Next, heat exchange when the temperature of the first medium 11 is higher than the temperature of the second medium will be described.

The first medium 11 is, for example, hot water heated by the heat exchange described above. The second medium 12 is, for example, water having a temperature lower than that of the first medium 11. As long as the temperature of the second medium 12 is lower than the temperature of the first medium 11, a type of each medium is not limited to an above type of medium. In order to prevent bearings in the heat transfer tubular body 3 from being contaminated and from malfunctioning, it is desirable that the first medium 11 flowing in the first region 25 is a fluid cleaner than the second medium 12.

Flowing paths of the first medium 11 and the second medium 12 are similar as flowing paths of the first medium 11 and the second medium 12 described above. That is, the second medium 12 is present in the second region 26. The first medium 11 is supplied from the introduction pipe 15 into the central member 2, then sequentially flows inside the central member 2 and inside the heat transfer tubular body 3, and finally is discharged from the discharge pipe 16. When the first medium 11 flows in the heat transfer tubular body 3, heat exchange is performed between the first medium 11 and the second medium 12 via the heat transfer tubular body 3. Accordingly, the temperature of the first medium 11 decreases, and the temperature of the second medium 12 increases.

When the temperature of the first medium 11 is higher than the temperature of the second medium, a brush may be used as the outer sliding contact member 6 as in the case described above.

(Functions and Effects)

Next, functions and effects of the above rotary heat exchanger 1 will be described.

The rotary heat exchanger 1 according to the present embodiment includes the heat transfer tubular body 3 which allows the first medium 11 to flow therein and allows the second medium 12 having a temperature different from that of the first medium 11 to flow outside the heat transfer tubular body 3. Since the first medium 11 and the second medium 12 different having temperatures thus are respectively disposed inside and outside the heat transfer tubular body 3, heat exchange is performed between the first medium 11 and the second medium 12 via the heat transfer tubular body 3. Since the outer sliding contact member 6 is disposed on the outer circumferential portion of the heat transfer tubular body 3, when the heat transfer tubular body 3 rotates, the outer sliding contact member 6 comes into sliding contact with the outer circumferential surface of the heat transfer tubular body 3. Accordingly, at least one of a boundary film and a solidified layer of the second medium 12 positioned at a boundary portion between the second medium 12 and the heat transfer tubular body 3 is peeled off by the outer sliding contact member 6, and heat transfer resistance between the second medium 12 and the heat transfer tubular body 3 is reduced. Therefore, a decrease in heat transfer efficiency due to formation of at least one of the boundary film and the solidified layer can be prevented.

The heat transfer tubular body 3 is rotatably supported with respect to the central member 2 via the bearings 17 and 18 disposed at the two end portions in the axial direction of the central member 2 fixed coaxially with the heat transfer tubular body 3. Since the heat transfer tubular body 3 is supported by the central member 2 at the two end portions in the axial direction, whirling of the heat transfer tubular body 3 when the heat transfer tubular body 3 rotates is reduced as compared with that in the related art in which the heat transfer tubular body is supported only on one side in the axial direction. Therefore, as compared with that in the related art, it is possible to prevent formation of a gap between the heat transfer tubular body 3 and the outer sliding contact member 6 during the rotation of the heat transfer tubular body 3. Accordingly, the outer sliding contact member 6 can be stably brought into sliding contact with the outer circumferential surface of the heat transfer tubular body 3. Therefore, the boundary film on the outer circumferential surface of the heat transfer tubular body 3 can be reliably peeled off, and the heat transfer resistance between the heat transfer tubular body 3 and the second medium 12 can be reduced. Further, since a clearance between the heat transfer tubular body 3 and the outer sliding contact member 6 can be easily controlled, the outer sliding contact member 6 can be formed of a member having higher strength than that in the related art. Therefore, the boundary film and the like can be removed more effectively.

Therefore, it is possible to provide the rotary heat exchanger 1 in which the heat transfer efficiency is further improved as compared with that in the related art.

By reducing the whirling of the heat transfer tubular body 3, it is possible to improve durability of each of the bearings 17 and 18 and the seal portion 27, and also to reduce rotational power, that is, power consumption, or to reduce noise.

The rotary heat exchanger 1 includes the inner sliding contact member 5 which is in sliding contact with the inner circumferential surface of the heat transfer tubular body 3. When the heat transfer tubular body 3 rotates, the inner sliding contact member 5 comes into sliding contact with the inner circumferential surface of the heat transfer tubular body 3. Therefore, the boundary film of the first medium 11 positioned at a boundary portion between the first medium 11 and the heat transfer tubular body 3 is peeled off by the inner sliding contact member 5. Accordingly, heat transfer resistance between the first medium 11 and the heat transfer tubular body 3 is reduced. Therefore, a decrease in heat transfer efficiency due to formation of the boundary film can be prevented. The inner sliding contact member 5 is attached to the central member 2, and the heat transfer tubular body 3 is supported on two sides in the axial direction with respect to the central member 2. Accordingly, even when the heat transfer tubular body 3 rotates, it is possible to prevent formation of a gap between the heat transfer tubular body 3 and the inner sliding contact member 5, and to stably bring the inner sliding contact member 5 into sliding contact with the heat transfer tubular body 3. Therefore, the heat transfer efficiency of the rotary heat exchanger 1 can be improved by reducing residuals of the boundary film and reducing the heat transfer resistance.

Figure 3:
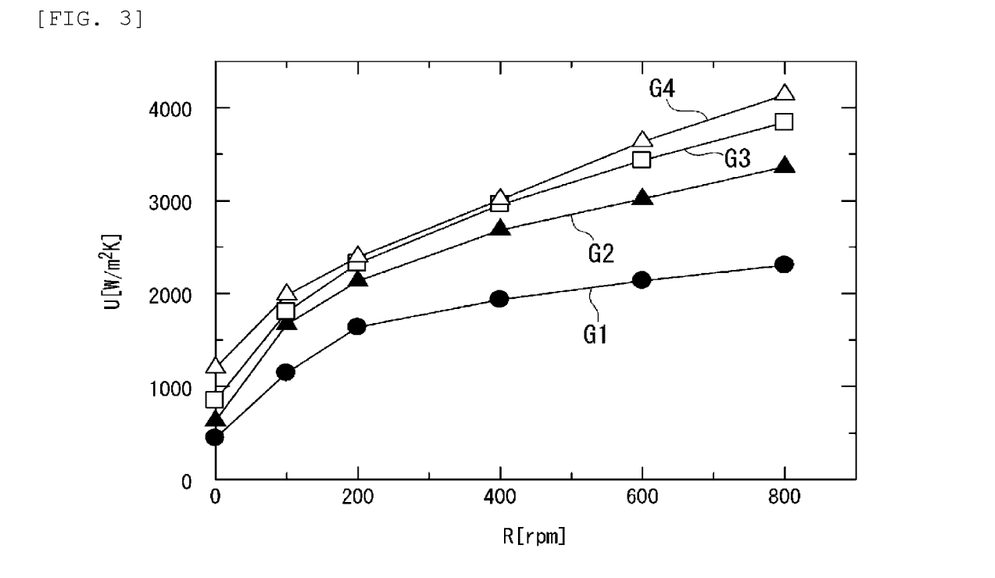
FIG. 3 is a graph showing a relationship between a rotation speed and an overall heat transfer coefficient of a heat transfer tubular body when the heat transfer tubular body and an inner sliding contact member are in contact with each other in a heat dissipation test.
Figure 4:
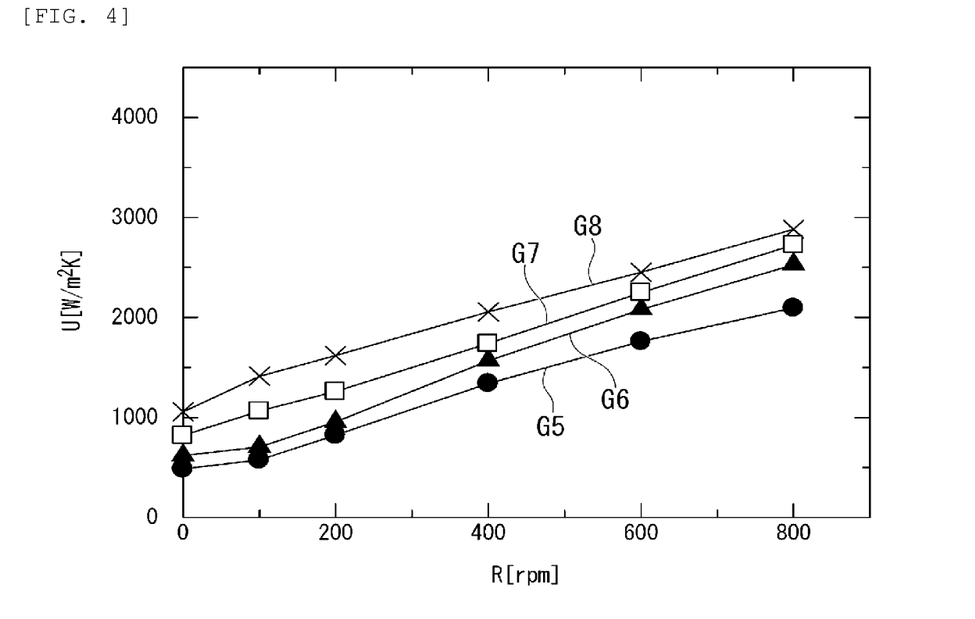
FIG. 4 is a graph showing a relationship between the rotation speed and the overall heat transfer coefficient of the heat transfer tubular body when a gap is formed between the heat transfer tubular body and the inner sliding contact member in a heat dissipation test.

Here, an influence of the configuration of the inner sliding contact member 5 on the heat transfer efficiency of the rotary heat exchanger 1 will be described. FIG. 3 is a graph showing a relationship between a rotation speed R and an overall heat transfer coefficient U of the heat transfer tubular body 3 when the heat transfer tubular body 3 and the inner sliding contact member 5 are in contact with each other in a heat dissipation test. FIG. 4 is a graph showing a relationship between the rotation speed R and the overall heat transfer coefficient U of the heat transfer tubular body 3 when a gap is formed between the heat transfer tubular body 3 and the inner sliding contact member 5 in a heat dissipation test. The overall heat transfer coefficient U in the figure is a reciprocal of an overall heat transfer resistance, and the larger the overall heat transfer coefficient U, the smaller the overall heat transfer resistance, and the heat transfer efficiency during heat exchange improves. A plurality of graphs G1 to G8 in the figure represent results of experiments performed for each flow velocity of the first medium 11 flowing in the heat transfer tubular body 3. Specifically, the graphs G1 and G5 represent experimental results when the flow velocity is 1 L/min, the graphs G2 and G6 represent experimental results when the flow velocity is 2 L/min, the graphs G3 and G7 represent experimental results when the flow velocity is 5 L/min, and the graphs G4 and G8 represent experimental results when the flow velocity is 10 L/min.

As shown in FIGS. 3 and 4, the overall heat transfer coefficient U when the inner sliding contact member 5 is in contact with the heat transfer tubular body 3 (see FIG. 3) is larger than the overall heat transfer coefficient U when a gap is formed between the inner sliding contact member 5 and the heat transfer tubular body 3 (see FIG. 4). That is, as compared with the case where a gap is formed between the inner sliding contact member 5 and the heat transfer tubular body 3, when the inner sliding contact member 5 is in contact with the heat transfer tubular body 3, the boundary film is more reliably peeled off, and thus the heat transfer efficiency is easily improved. Remarkable effects are obtained when the inner sliding contact member 5 is in contact with the heat transfer tubular body 3 particularly during low rotation. In a range of this experiment, it can be seen that these effects are obtained regardless of the flow velocity of the first medium 11.

According to the inner sliding contact member 5 of the present embodiment, since the tip end portion 36a of the inner sliding contact member 5 is softer than the base end portion 36b, the tip end portion 36a is flexibly deformed following a rotation operation of the heat transfer tubular body 3. Accordingly, when the heat transfer tubular body 3 rotates, the heat transfer tubular body 3 and the inner sliding contact member 5 can always be kept in contact with each other. Therefore, as shown in experimental results of FIGS. 3 and 4, the overall heat transfer coefficient U can be increased by further reducing the residuals of the boundary film. Therefore, the heat transfer resistance can be reduced, and the heat transfer efficiency during heat exchange can be improved.

The rotary heat exchanger 1 includes the outer cylinder 4 which is provided coaxially with the heat transfer tubular body 3 and which is disposed on the outer side of the heat transfer tubular body 3 in the radial direction at a predetermined interval. Since the outer sliding contact member 6 is disposed in the second region 26 surrounded by the heat transfer tubular body 3 and the outer cylinder 4 and the second medium 12 flows in the second region 26, when the heat transfer tubular body 3 rotates, the second medium 12 easily flows due to the outer sliding contact member 6. Therefore, it is possible to further improve the heat transfer efficiency between the heat transfer tubular body 3 and the second medium 12. A heat capacity of the second medium 12 can be utilized as effectively as possible.

The central member 2 is provided with the introduction pipe 15 and the discharge pipe 16 for introducing and discharging the first medium 11. Since the central member 2 is fixed, the introduction pipe 15 and the discharge pipe 16 can be easily provided as compared with a case where the introduction pipe 15 and the discharge pipe 16 are coupled to the rotating heat transfer tubular body 3, for example. Vibration transmitted to the heat transfer tubular body 3 during introduction and discharge of the first medium 11 can be reduced. Therefore, it is possible to further reduce whirling, vibration, and the like of the heat transfer tubular body 3. The introduction pipe 15 and the discharge pipe 16 may be formed as double pipes.

The heat transfer tubular body 3 is rotatably supported with respect to the central member 2 disposed on the inner side of the heat transfer tubular body 3. The first medium 11, which is cleaner than the second medium 12, flows inside the heat transfer tubular body 3. Accordingly, the bearings 17 and 18 disposed between the central member 2 and the heat transfer tubular body 3 are less likely to be contaminated, and even when a bearing such as a rolling bearing or a slide bearing having high dimensional accuracy is used, operations of the bearings 17 and 18 can be favorably maintained. Therefore, it is possible to further reduce whirling, vibration, and the like of the heat transfer tubular body 3. Further, since the whirling of the heat transfer tubular body 3 is reduced, the durability of the bearings 17 and 18 and the seal portion 27 can be improved.

Second Embodiment

Figure 5:
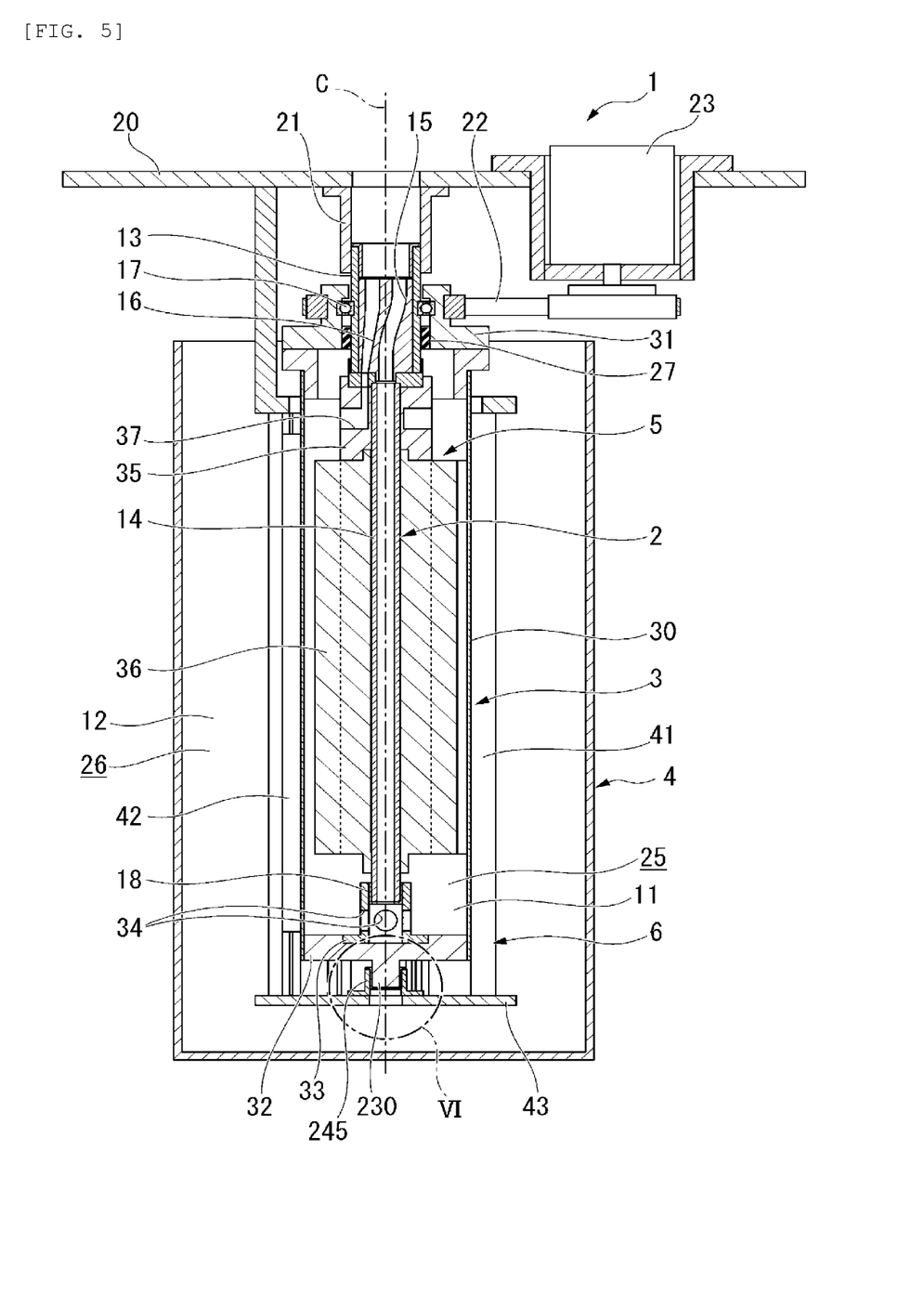
FIG. 5 is a cross-sectional view of a rotary heat exchanger according to a second embodiment.
Figure 6:
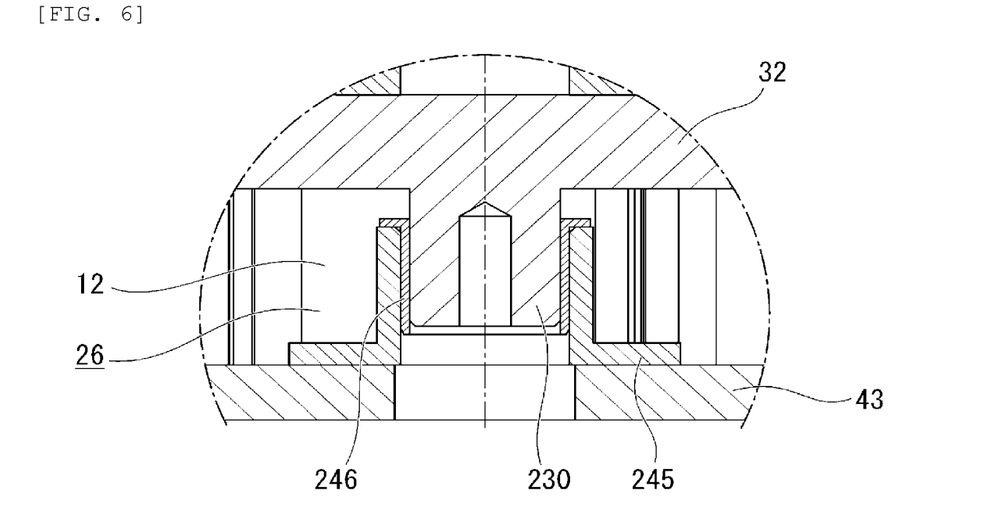
FIG. 6 is an enlarged view of a portion VI in FIG. 5.

Next, a second embodiment according to the invention will be described. FIG. 5 is a cross-sectional view of the rotary heat exchanger 1 according to the second embodiment. FIG. 6 is an enlarged view of a portion VI in FIG. 5. In the following description, the similar components as those of the first embodiment described above are denoted by the same reference signs, and the description thereof will be appropriately omitted.

The second embodiment is different from the first embodiment in that the heat transfer tubular body 3 is rotatably supported by the bottom plate 43 of the outer sliding contact member 6.

As shown in FIGS. 5 and 6, in the second embodiment, the heat transfer tubular body 3 is rotatably supported with respect to the bottom plate 43 which supports the outer sliding contact member 6. Specifically, the bottom plate 43 is provided with a fitting portion 245. The fitting portion 245 is formed in a tubular shape coaxial with the central axis. The fitting portion 245 is coupled to and fixed to the bottom plate 43.

The second closing member 32 of the heat transfer tubular body 3 has a projection portion 230 projecting toward an opposite side with respect to the relay member 33 in the axial direction. As shown in FIG. 6, the projection portion 230 is provided coaxially with the fitting portion 245. The projection portion 230 is inserted into the fitting portion 245. An annular bushing 246 is interposed between the projection portion 230 and the fitting portion 245. The bushing 246 is formed of a material having a small friction coefficient in order to allow the projection portion 230 to slip with respect to the fitting portion 245 in the rotation direction centered on the central axis C. Accordingly, in addition to the first bearing 17 and the second bearing 18, the heat transfer tubular body 3 is rotatably supported from both inside and outside in the axial direction of the heat transfer tubular body 3 with the second closing member 32 sandwiched, by causing the projection portion 230 to slip with respect to the fitting portion 245 of the bottom plate 43.

According to the second embodiment, the heat transfer tubular body 3 is rotatably supported by the bottom plate 43 positioned outside the heat transfer tubular body 3. Accordingly, the heat transfer tubular body 3 can be supported from the inside and outside by the central member 2 positioned inside the heat transfer tubular body 3 and the bottom plate 43 positioned outside the heat transfer tubular body 3. Therefore, it is possible to more stably support the heat transfer tubular body 3 and to further reduce the whirling of the heat transfer tubular body 3 during the rotation of the heat transfer tubular body 3.

Third Embodiment

Figure 7:
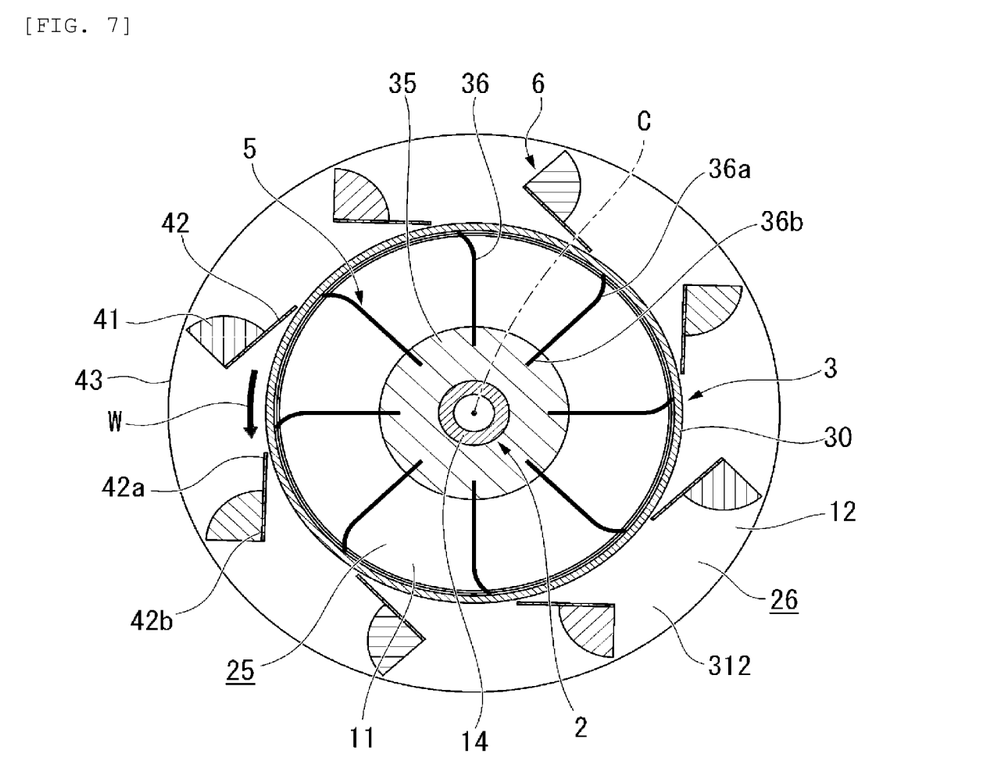
FIG. 7 is a cross-sectional view of a rotary heat exchanger according to a third embodiment taken along a plane orthogonal to an axial direction.

Next, a third embodiment according to the invention will be described. FIG. 7 is a cross-sectional view of the rotary heat exchanger according to the third embodiment taken along a plane orthogonal to the axial direction. In the following description, the similar components as those of the first embodiment described above are denoted by the same reference signs, and the description thereof will be appropriately omitted.

The third embodiment is different from the first embodiment in that a latent heat storage material 312 is used as the second medium 12 and the outer sliding contact member 6 is disposed at a predetermined angle.

In the third embodiment, the latent heat storage material 312 is disposed as the second medium 12 in the second region 26. The latent heat storage material 312 is a material capable of storing heat at high density by using latent heat during solid-liquid phase transformation. A type of the latent heat storage material 312 is not particularly limited as long as the latent heat storage material 312 is a phase change substance capable of storing heat at high density by using latent heat during solid-liquid phase transformation, and examples thereof include paraffin, sodium acetate trihydrate, erythritol, and molten salt.

During heat storage, a solidification phase of the latent heat storage material 312 gradually changes into a liquid from a vicinity of the outer circumferential surface of the heat transfer tubular body 3. Heat supplied from the first medium 11 moves through the liquid latent heat storage material 312 to the solidification phase. At this time, due to the rotation of the heat transfer tubular body 3, the latent heat storage material 312 which changes from the solidification phase to the liquid flows in the vicinity of the outer circumferential surface of the heat transfer tubular body 3. A convective heat transfer rate by the flow of the liquefied latent heat storage material 312 is higher than a conduction heat transfer rate in the stationary latent heat storage material 312, so that a heat storage rate is increased. Further, when this flow collides with the outer sliding contact member 6, a flow in a direction perpendicular to the outer circumferential surface of the heat transfer tubular body 3 is generated. Accordingly, the latent heat storage material 312 is uniformly stirred, and heat transfer from the heat transfer tubular body 3 to the solidification phase of the latent heat storage material 312 is promoted, so that the heat storage rate is further increased.

On the other hand, during heat dissipation, the solidification phase of the latent heat storage material 312 adhering to the outer circumferential surface of the heat transfer tubular body 3 is peeled off from the outer circumferential surface of the heat transfer tubular body 3 by the outer sliding contact member 6 as the heat transfer tubular body 3 rotates. Accordingly, heat transfer resistance in the vicinity of the outer circumferential surface of the heat transfer tubular body 3 is reduced, and a heat transfer speed between the heat transfer tubular body 3 and the latent heat storage material 312 is increased.

In the third embodiment in which the latent heat storage material 312 is thus used, it is desirable that the outer sliding contact member 6 has a shape in which an effect of peeling off the solidification phase of the latent heat storage material 312 is enhanced. Specifically, in the third embodiment, the outer blade 42 of the outer sliding contact member 6 is formed of a plate-shaped member made of metal, resin, or the like having higher hardness than the elastic material of the outer blade 42 in the first embodiment. When viewed in the axial direction, the outer blade 42 is inclined so as to move away from the central axis C from an upstream side toward a downstream side in the rotation direction W of the heat transfer tubular body 3. It is desirable to adjust an inclination angle of the outer blade 42 with respect to a normal direction (radial direction) of the heat transfer tubular body 3 as viewed from the axial direction to an angle at which the solidification phase is easily peeled off according to the type of the latent heat storage material 312.

As described above, the outer sliding contact member 6 extends in a direction facing the rotation direction W from the base end portion 42b toward the tip end portion 42a. Accordingly, the boundary film, the solidification phase, and the like peeled off from the outer circumferential surface of the heat transfer tubular body 3 easily move to the outer side in the radial direction along the outer sliding contact member 6. Therefore, it is possible to reduce rotational resistance acting on the heat transfer tubular body 3 when the boundary film, the solidification phase, or the like is peeled off from the outer circumferential surface of the heat transfer tubular body 3. By reducing the rotational resistance of the heat transfer tubular body 3, it is possible to reduce power consumption related to driving of the rotary heat exchanger 1.

The latent heat storage material 312 is used as the second medium 12. Accordingly, it is possible to store more heat received from the first medium 11 during heat storage, and it is possible to dissipate more heat during heat dissipation. That is, an effective heat utilization rate can be improved. Since the rotary heat exchanger 1 includes the outer sliding contact member 6, for example, when the solidification phase of the latent heat storage material 312 is generated, the solidification phase adhering to the outer circumferential surface of the heat transfer tubular body 3 can be peeled off by the outer sliding contact member 6. Accordingly, the heat transfer efficiency between the heat transfer tubular body 3 and the latent heat storage material 312 can be maintained in a high state. Further, a heat transfer rate can be improved by stirring the latent heat storage material 312 by the outer sliding contact member 6 to cause the latent heat storage material 312 to flow.

The technical scope of the invention is not limited to the above embodiments, and various modifications can be added without departing from the spirit of the invention.

For example, in the above embodiment, a configuration in which a brush or a plate-shaped blade member is used as the outer sliding contact member 6 is described, but the invention is not limited thereto. The outer sliding contact member 6 may be, for example, a roller or the like which comes into contact with the outer circumferential surface of the heat transfer tubular body 3 and which rotates in accordance with the rotation of the heat transfer tubular body 3. A plurality of rollers may be provided along the axial direction or the circumferential direction of the heat transfer tubular body 3.

In the third embodiment, a liquid filler may be disposed between the outer circumferential surface of the heat transfer tubular body 3 and the latent heat storage material 312 under a temperature condition during heat exchange (during heat dissipation and during heat storage) without being mixed with the latent heat storage material 312. The liquid filler preferably has a lower melting point, a lower density, a lower viscosity, a higher specific heat, and a lower vapor pressure than those of the latent heat storage material 312. A boiling point and a flash point of the liquid filler are preferably equal to or higher than upper limit temperatures during heat exchange. Examples of such a liquid filler include various heat transfer oils and lubricating oils such as a silicone oil, a mineral oil, and a chemical synthetic oil, and oils such as paraffin. By providing the liquid filler, the heat storage rate is further increased. When a hydrate-based latent heat storage material 312 such as sodium acetate trihydrate is used as the latent heat storage material 312, evaporation of water can be reduced, and when a sugar such as erythritol or a sugar alcohol-based latent heat storage material 312 is used, oxidation caused by air can be reduced.

Figure 8:
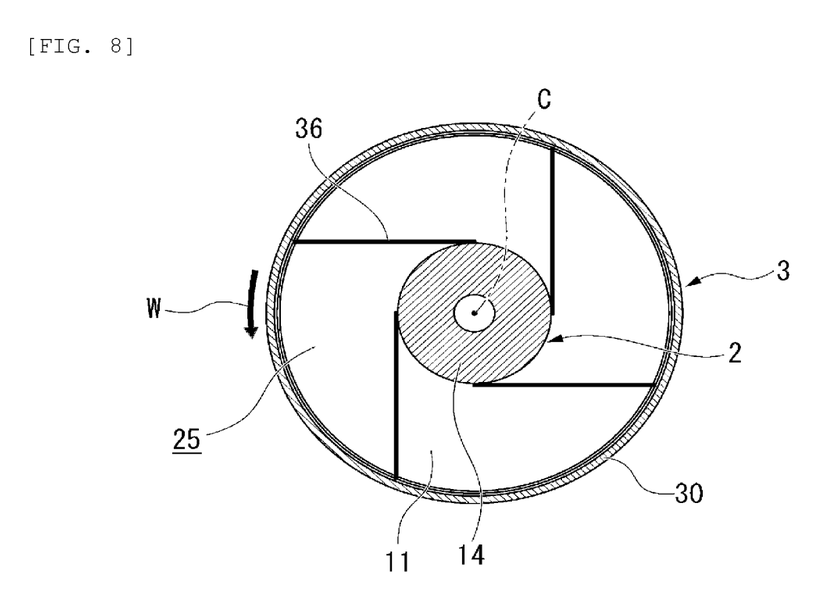
FIG. 8 is a cross-sectional view of a rotary heat exchanger according to a modification taken along a plane orthogonal to an axial direction.

FIG. 8 is a cross-sectional view of the rotary heat exchanger according to a modification taken along a plane orthogonal to the axial direction. In FIG. 8, components on an outer side of the heat transfer tubular body 3 in the radial direction are omitted. In the embodiment described above, a configuration in which the inner blade 36 extends radially from an inside in the radial direction toward an outside in the radial direction when viewed from the axial direction is described, but a shape of the inner blade 36 is not limited thereto. For example, as shown in FIG. 8, the inner blade 36 may extend along a tangential direction of the central member when viewed from the axial direction. The inner blade 36 thus formed may be fixed to the central member 2 by being struck onto an outer surface of the central member 2.

The numbers of the inner blades 36 and the outer blades 42 are not limited to the numbers in the above embodiments.

The inclination angle of the outer blade 42 as viewed in the axial direction is not limited to the above angle and the inclination angle shown in the figures. The inclination angle of the outer blade 42 may be changed depending on a type of the medium. In addition to the case of using the latent heat storage material 312 shown in the third embodiment, the invention can also be applied to a case of using a medium in which a solid product such as a precipitate is generated.

The outer blade fixing portion 41 of the outer sliding contact member 6 and the bottom plate 43 may be coupled to the outer cylinder 4. Types and the numbers of first bearings 17 and second bearings 18 are not limited to types and the numbers in the above embodiments.

Media of types other than the above media may be used as the first medium 11 and the second medium 12. Specifically, as a combination of the first medium 11 and the second medium 12, for example, water, oil, polluted water such as hot springs, high-viscosity oil, fat and oil, and a latent heat storage material may be used in combination. The first medium 11 and the second medium 12 may have different temperatures, and the temperature of the second medium 12 may be higher or lower than that of the first medium 11.

In addition, it is possible to appropriately replace components in the above embodiments with known components without departing from the spirit of the invention, and the embodiments mentioned above may be suitably combined.

INDUSTRIAL APPLICABILITY

As described above, according to the invention, it is possible to obtain the rotary heat exchanger 1 in which the heat transfer efficiency is further improved as compared with that in the related art.

Therefore, the rotary heat exchanger 1 according to the invention is high in heat transfer performance between the first medium 11 and the second medium 12, and thus is effective in cascade use of heat. Therefore, the invention is useful for applications such as, a heat transport system which stores and transports industrial exhaust heat and uses the heat for consumer use, a system which stores industrial exhaust heat and uses the heat as a heat source of an absorption refrigerator or the like on the spot, a system which stores heat using late-night power with a low unit price and uses the heat during a day when the unit price is high, and a sunlight variation mitigation system which stores heat using surplus power of solar power generation or collected sunlight light and heat and supplies heat when sunlight is blocked regardless of the day or night. Further, in a situation in which a solidification phase or a solid product is generated during heat exchange, such as the latent heat storage material 312 or spring water of hot spring, it is possible to prevent the solidification phase or the solid product from adhering to the surface of the heat transfer tubular body 3. Therefore, the rotary heat exchanger 1 is useful as a heat exchanger using the latent heat storage material 312, spring water of hot spring, or the like as a medium.

REFERENCE SIGN LIST

1 rotary heat exchanger
2 central member
3 heat transfer tubular body
4 outer cylinder
5 inner sliding contact member
6 outer sliding contact member
11 first medium
12 second medium
15 introduction pipe
16 discharge pipe
17 first bearing (bearings)
18 second bearing (bearings)
36*a* tip end portion
36*b* base end portion
43 bottom plate
312 latent heat storage material
C central axis

The invention claimed is:

1. A rotary heat exchanger comprising:
   a tubular-shaped heat transfer tubular body which is rotatable with a central axis as a rotation center, which allows a first medium to flow therein, and outside of which a second medium having a temperature different from a temperature of the first medium is disposed;
   a central member which is provided on an inner side of the heat transfer tubular body in a radial direction, which is fixed coaxially with the heat transfer tubular body and through which the first medium circulates from one side to the other side in the axial direction;
   a pair of bearings which is respectively located at the one side and the other side of an end of the central member in the axial direction; and
   an outer sliding contact member which is in sliding contact with an outer circumferential surface of the heat transfer tubular body, wherein
   the heat transfer tubular body is rotatably supported with respect to the central member via the bearings disposed at the one side and the other side of end portions of the central member in the axial direction,
   the heat transfer tubular body has a relay member which is provided at the other side of the central member and supplies the first medium circulating inside the central member between the heat transfer tubular body and the central member, and
   the relay member is formed so that the first medium circulates therein and rotates with a main body portion of the heat transfer tubular body, and supplies the first medium to the heat transfer tubular body from a position away from the central member in the axial direction than the other side of the central member.

2. The rotary heat exchanger according to claim 1, further comprising:
   an inner sliding contact member which is attached to the central member and which is in sliding contact with an inner circumferential surface of the heat transfer tubular body.

3. A rotary heat exchanger comprising:
   a tubular-shaped heat transfer tubular body which is rotatable with a central axis as a rotation center, which allows a first medium to flow therein, and outside of which a second medium having a temperature different from a temperature of the first medium is disposed;
   at least one of an outer sliding contact member which is in sliding contact with an outer circumferential surface of the heat transfer tubular body and an inner sliding contact member which is in sliding contact with an inner circumferential surface of the heat transfer tubular body;
   a central member which is provided on an inner side of the heat transfer tubular body in a radial direction, which is fixed coaxially with the heat transfer tubular body and through which the first medium circulates from one side to the other side in the axial direction; and
   a pair of bearings which is respectively located at the one side and the other side of an end of the central member in the axial direction; wherein
   the heat transfer tubular body is rotatably supported with respect to the central member via the bearings disposed at the one side and the other side of end portions of the central member in the axial direction, the heat transfer tubular body has a relay member which is provided at the other side of the central member and supplies the first medium circulating inside the central member between the heat transfer tubular body and the central member, and the relay member is formed so that the first medium circulates therein and rotates with a main body portion of the heat transfer tubular body, and supplies the first medium to the other side of the central member in the axial direction than the other side of the central member.

4. The rotary heat exchanger according to claim 2, wherein in the inner sliding contact member, a tip end portion in sliding contact with the heat transfer tubular body has higher flexibility than a base end portion positioned on a central member side in the radial direction.

5. The rotary heat exchanger according to claim 1, wherein the central member includes:

an introduction pipe configured to introduce the first medium into the heat transfer tubular body from one end portion in the axial direction; and a discharge pipe provided at the one end portion in the axial direction and configured to discharge the first medium subjected to heat exchange from an inside of the heat transfer tubular body.

6. The rotary heat exchanger according to claim 1, wherein the second medium is a latent heat storage material configured to store heat using latent heat during solid-liquid phase transformation.

7. The rotary heat exchanger according to claim 1, further comprising:

an outer cylinder which is provided coaxially with the heat transfer tubular body and which is disposed on an outer side of the heat transfer tubular body in the radial direction at a predetermined interval, wherein the outer sliding contact member is disposed between the heat transfer tubular body and the outer cylinder, and the second medium flows between the heat transfer tubular body and the outer cylinder.

8. The rotary heat exchanger according to claim 1, wherein when viewed in the axial direction, the outer sliding contact member is inclined so as to move away from the central axis from an upstream side to a downstream side in a rotation direction of the heat transfer tubular body.

9. The rotary heat exchanger according to claim 1, further comprising:

a bottom plate which supports the outer sliding contact member, wherein the heat transfer tubular body is rotatably supported by the bottom plate.

* * * * *